Sept. 26, 1961
R. W. BUNDY
3,001,265
FLAT LOW MELTING POINT METAL FILAMENT HAVING
AN ORIENTED SYNTHETIC RESIN SHEATH
Filed March 25, 1957
3 Sheets-Sheet 1
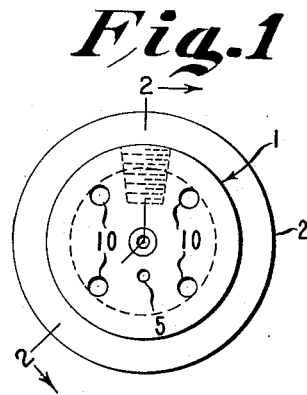
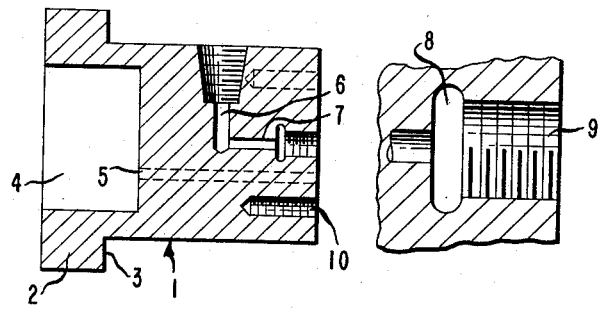
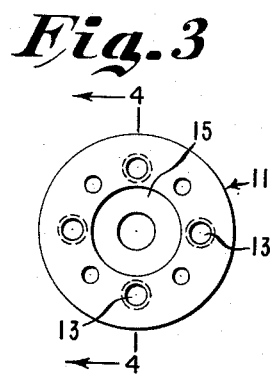
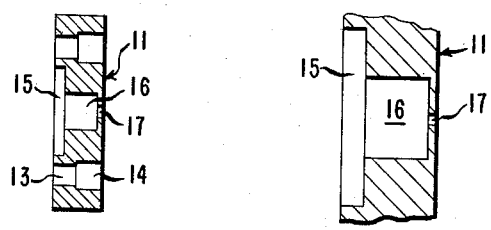
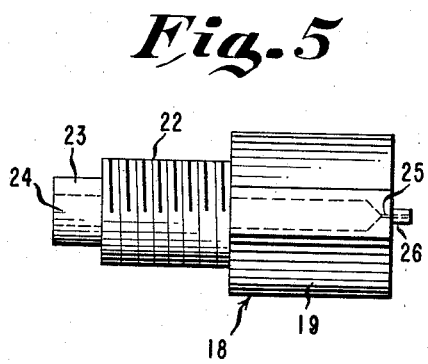
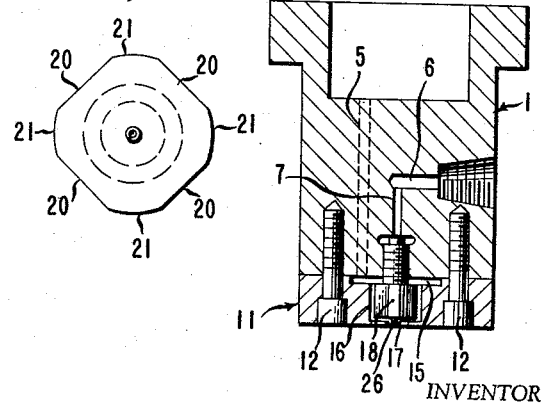
INVENTOR
ROBERT W. BUNDY
BY *Charles F. Daley*
ATTORNEY Sept. 26, 1961 R. W. BUNDY 3,001,265
FLAT LOW MELTING POINT METAL FILAMENT HAVING
AN ORIENTED SYNTHETIC RESIN SHEATH
Filed March 25, 1957 3 Sheets-Sheet 2

INVENTOR
ROBERT W. BUNDY
BY
ATTORNEY

United States Patent Office 3,001,265
Patented Sept. 26, 1961

3,001,265
FLAT LOW MELTING POINT METAL FILAMENT HAVING AN ORIENTED SYNTHETIC RESIN SHEATH
Robert Wendel Bundy, Greenville, Del., assignor to E. I. du Pont de Nemours and Company, Wilmington, Del., a corporation of Delaware
Filed Mar. 25, 1957, Ser. No. 648,374
6 Claims. (Cl. 28—82)

This invention is related to flat filaments and ribbons of polymeric material having a metal core and to a process and apparatus for producing same. It is particularly concerned with decorative ribbons and special insulated conductors comprising a metal core embedded in a synthetic linear polymer.

The use of polymers as electrical insulators is well known. Such polymers have been applied to preformed wires from a solution of the polymer, from a dispersion of the polymer followed by coalescence or fusion and from a melt of the polymer. All such processes have had disadvantages of non-uniform coating, limited thickness, and the presence of hazardous conditions when using solutions of polymers such as polyamides and polyesters.

A serious limitation on the previous methods of coating electrical conductors is the fact that in the case of very fine wires, their handling during the coating operation as well as the proper application of the coating are quite difficult. Many types of conductors that would be of great utility if coated, do not lend themselves to conventional coating processes because of their inherent weakness when in the form of very small diameter wires. Furthermore, in order to obtain very fine wires, long and expensive wire drawing and annealing steps are required, thereby adding considerably to the cost of the final insulated product.

It is known to eject a mixture of a molten metal and a fiber-forming polymer into an air jet to produce short curled filaments with irregular and non-uniform structure but such process does not relate to the making of continuous filaments having a predetermined and definite core and sheath.

The most desirable physical properties of polymers such as polyamides and polyesters are obtained through orientation of the polymers by a drawing operation which usually extends the polymer to two or more times its original length, depending on the degree of orientation and the filament denier desired. The usual coating procedure produces little, if any, orientation. It is possible to partially orient the coating by drawing a metal core coated with a molten polymer through a die at a rate such that the core moves faster than the coating. This method produces, however, only a negligible amount of orientation since the percent of draw is limited to the amount of draw given to the metal and is generally not in excess of 10% draw, the percent of draw being the percent of the original length that is permanently added (i.e., not regained by release of the drawing tension) during the drawing operation.

As a result of their limitations, the coated conductors of the prior art have depended upon the metal core itself rather than upon the polymeric coating for their strength, and have had their applications limited to electrical conduction due to the stiffness of the product.

A molten polymer and a molten metal can be co-spun into sheath-core filaments, i.e., filaments containing a metal core and a sheath composed of polymer. Although such filaments can be drawn to an extent sufficient to obtain a filament strong enough for certain purposes, the amount of draw is limited by the extensibility of the metal core. In general, the limit of elongation of the metal in such a product is much lower than that of the polymer, so that the strength of filaments made by this process is less than that desired for many purposes.

It has been proposed to make decorative ribbon by laminating a thin metal film between two plastic films and then slitting the laminate to strips. By its very nature, such a process is very time consuming and expensive and is applicable to the production of only relatively large denier ribbons. Also, such products have been limited, from a practical standpoint, to those having continuous metal inserts.

It is an object of this invention to produce a continuous relatively flat filament of relatively small denier, particularly the deniers used in textiles, comprising a continuous metal core surrounded by a highly oriented synthetic polymer sheath. A further object is the production of decorative continuous filaments with a ribbon-like cross-section comprising a reflective continuous metal core enclosed in a sheath of an oriented synthetic polymer. A further object is the production of continuous filaments containing a longitudinal row of flat reflective platelets of a metal completely covered by an oriented synthetic polymer. Other objects will appear hereinafter.

The objects of this invention have been attained by simultaneously spinning a molten polymer and a metal that melts at or below the temperature at which the polymer or its solution is extruded, as a continuous sheath and core respectively of a composite filament, and then submitting the filament to rolling and/or drawing in such sequence as is desired to produce a flattened cross-section both for the sheath and core with the desired effects referred to herein.

Apparatus shown in the application of Alvin L. Breen filed of even date herewith and entitled "Metal Core Composite Filaments" is admirably suited for the production of filaments which may be shaped into the ribbon-like products described and claim herein. However, the present invention includes also a special apparatus particularly adapted for the making of single multi-component filaments and the invention will be particularly described with respect to this novel apparatus.

Referring to the drawings,

FIGURE 1 is an end view of the spinning block forming part of a spinneret assembly suitable for making filaments of this invention;

FIGURE 2 is an elevation in section, along plane 2—2 of FIGURE 1, of the spinning block of FIGURE 1;

FIGURE 2A is a detailed view (on a larger scale) of a screw-threaded hole shown in FIGURE 2;

FIGURE 3 is an end view of the bottom or spinning plate containing the spinning orifice and adapted to be attached to the spinning block of FIGURES 1 and 2;

FIGURE 4 is an elevation in section along plane 4—4 of FIGURE 3;

FIGURE 4A is a detailed view (magnified) of the spinning orifice and chamber communicating therewith for the reception of a plug adapted to permit the conducting of spinning fluid to the spinning orifice;

FIGURE 5 is an elevation of a design of plug to be received into the spinning plate of FIGURE 4 for the conducting of spinning fluid to the spinning orifice;

FIGURE 6 is an end view of the plug of FIGURE 5 showing the peripheral shape of the plug;

FIGURE 7 is a front elevation in section along a central plane showing the spinning block and spinning plate, together with the fluid conducting plug, in assembled position.

Figure 8:
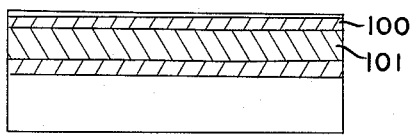
Figure 9:
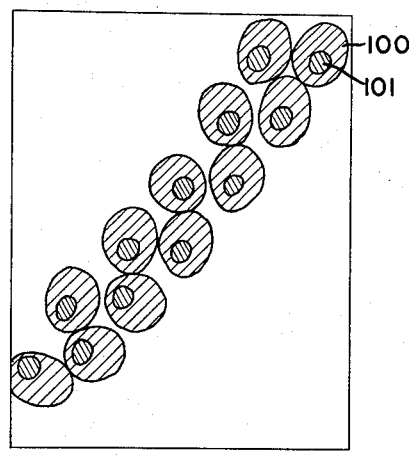

The equipment shown in the figures is adapted to be used in vertical position as shown in FIGURE 7 but FIGURES 1–6 inclusive are shown in horizontal position for ease of illustration.

FIGURES 8–16 inclusive are schematic representations of filaments in lengthwise and cross-sectional view made in accordance with the invention. In all instances polymeric sheath 100 surrounds metal core material 101.

Referring to the drawings, spinning block 1 having enlarged portion 2 provided with a shoulder 3 (for holding the spinning assembly in a suitable support) is shaped with a chamber 4 for receiving molten polymer and also for the reception of suitable filtering means (not shown) for the polymer. Spinning block 1 is provided with eccentrically disposed canal 5 for leading the molten polymer downwardly to the spinning plate.

Spinning block 1 is also provided with a passage 6 provided with a screw-threaded portion (as shown) adapted to receive the screw-threaded end of a conduit for leading molten metal into the spinning block. Hole 6 leads into passage 7 which terminates in a counterbore 8 larger in diameter than passage 7. Counterbore 8 leads into screwthreaded hole 9, the end of which is machined flat and parallel with the bottom surface of spinning block 1. Spinning block 1 is provided with several screw-threaded holes 10 for the reception of securing bolts as will be discussed in more detail hereinafter.

Bottom or spinning plate 11 is a flat circular plate of the same diameter as the bottom of spinning block 1 and is adapted to be secured to spinning block 1 by means of bolts 12 to be inserted through holes 13 in spinning plate 11 having enlarged heads received in counterbore 14 in spinning plate 11. The spinning plate is provided with a circular, shallow chamber 15 into which the polymer channel 5 opens for the leading of the molten polymer into chamber 15. Spinning plate 11 is formed at its center with circular bore 16 connecting with spinneret orifice 17.

The plug-shaped member 18 has an enlarged end 19 formed with four flat sides 20 forming chords of a circle of the same diameter as chamber 16 in the spinning plate with the chords terminating in arcuate portions 21 forming arcs of the aforesaid circle and adapted to fit closely in chamber 16 of the spinning plate. Plug 18 is provided with male screw-threaded portion 22 adapted to fit into the female counterpart 9 although not to its full depth. The screw-threaded element 22 terminates in a circular tube 23 adapted to abut the inner end of hole 8 which is doughnut-shaped as shown in FIGURE 2A, thus assuring accurate positioning of plug 18 when in operative position with the bottom of plug end 19 clear of the bottom of hole 16 to permit passage of fluid around plug 18 to the spinning orifice. Plug 18 is bored throughout the greater part of its length with channel 24 of the same diameter as conduit 7 for the leading of molten metal to the spinning orifice. Conduit 24 (shown in dotted lines in FIGURE 5) tapers (as shown) to a small diameter hole 25 of capillary size which extends through small diameter extension 26 on the outer end of plug 18. Projection 26 is of smaller diameter than spinning orifice 17 and is adapted to be received in spinning orifice 17 with its end flush with the bottom of spinning plate 11.

The operation of the above-described apparatus can be readily understood. Molten metal is supplied to the spinning block through hole 6 and proceeds through conduit 7, passage 24 and capillary 25 to the spinning orifice. Molten polymer from chamber 4 passes through conduit 5 to pool chamber 15, through the passage between straight sides 20 of the plug 18 and chamber 16 and is then extruded through the spinneret orifice 17 as a sheath around the metal core. The sheath-core filament is solidified by contact with a suitable coagulant such as air or water at a temperature considerably below the melting point of the metal and of the polymer.

The spinning orifice 17, inclusive of projection 26 of plug 18, is of a diameter within the range of those used for spinning textile denier filaments, e.g., 0.010 to 0.10 inch, the size of the spinning orifice being chosen according to the size of filament desired.

The above equipment is particularly suited to the spinning of single filaments, as distinct from the number of filaments normally spun for the making of yarn. It will be understood, however, that the invention is not limited to the use of a single-hole spinneret, but can be applied as stated above, to the simultaneous extrusion of a number of filaments, e.g., by the use of the spinneret of the aforesaid Breen patent application filed of even date herewith.

If desired, gaskets can be inserted between the spinning plate and the spinning block so as to insure that no leakage of spinning material will take place. Screw-threaded bolts 14 insure accurate and tight assembly of the parts of the equipment for the production of filaments of the desired uniform sheath-core form.

The apparatus depicted is connected with suitable piping and filtration apparatus as may be required to supply a molten polymer and a molten metal and is kept at a temperature sufficiently high during operation to maintain the polymer and the metal in the molten state.

In the examples, the relative viscosity ($\eta_r$), i.e., the viscosity of a solution of polymer relative to that of the solvent, is used as the measure of the molecular weight. The polyamide solutions contained 5.5 grams of polymer in 50 ml. of 90% formic acid and the viscosity was measured at 25° C. The polyester solutions contained 2.15 grams of the polymer in 20 ml. of a 7/10 mixture by weight of trichlorophenol/phenol and the viscosity was measured at 25° C.

The following examples in which parts, proportions and percentages are by weight unless otherwise specified, are intended to illustrate this invention and in no manner to limit it.

*Example 1*

Using a 1-hole spinneret similar to that shown in FIGURES 1–7 having an orifice 17 of 0.030 inch diameter surrounding projection 26 of 0.0180 inch outside diameter at the lower face of the spinneret with a passage 25 of 0.008 inch diameter, poly(ethylene terephthalate) of relative viscosity 37 was melt-spun as a sheath around a molten core of an alloy comprising 40% bismuth and 60% tin melting over the range 139–170° C. The composite filaments were spun at 290° C. and at 130 yards per minute into a 1-foot vertical tube of water at 33° C. which was pumped concurrently with the direction of travel of the extruded filament. Good spinning was enjoyed and continuous filaments obtained, a typical cross-section of which had a diameter of 0.009 inch and a core 0.006 inch in diameter (equivalent to 45% core by volume); the filament (magnified) is similar to that shown lengthwise in FIGURE 8 (one filament) and in cross-section in FIGURE 9 (showing several filaments), the metal core, in these figures as elsewhere in the figures of the filaments, appearing in black against the sheath shown in light color. The as-spun filaments had a tensile strength of 9900 pounds per square inch and could only be elongated a maximum of 3.7% without breaking the core at room temperature. A 10-inch length of the as-spun filament conducted a current of 0.67 ampere at 6 volts without fusing or degrading the polymeric sheath.

Figure 10:
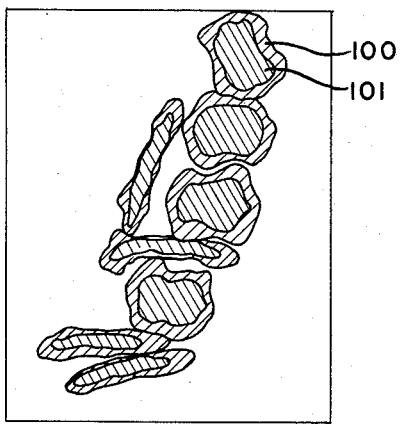
Figure 11:
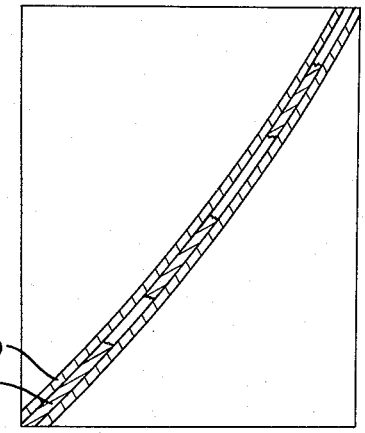
Figure 12:
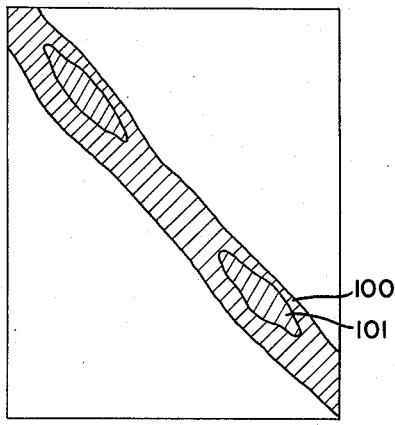
Figure 13:
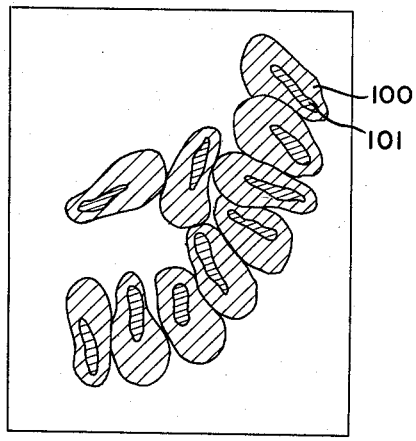
Figure 14:
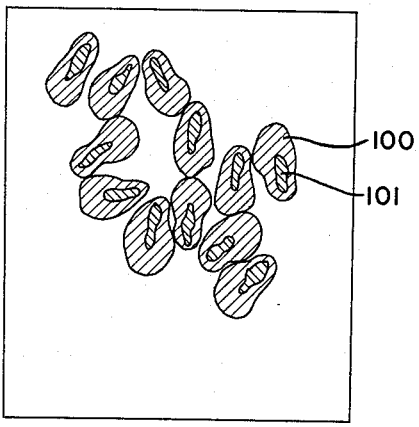

A portion of the as-spun filament was hand-rolled along its length with a metal roller at room temperature into a ribbon approximately 0.050 inch wide and 0.0015 inch thick, similar to that shown in cross-section in FIGURE 10. As shown in FIGURE 10, certain of the filaments were not flattened since the pressure of the hand-roller was not, in this case, effectively applied to all filaments. The rolling, while it flattened both sheath and core, did not break the sheath or separate the two components and the core of the resulting ribbon was continuous and had a much higher degree of reflectivity than the dull lead-like core of the as-spun yarn, so that it presented a glittering shiny surface. The rolling produced an increase in length equivalent to a 30% elongation of the as-spun fiber. The rolled product had a tensile strength of 10,400 pounds per square inch.

By changing the relative flow rates of polymer and metal, continuous filaments containing respectively 33% and 25% core by volume were obtained with an 8-hole spinneret such as that shown in the aforesaid Breen patent application filed of even date herewith, and using the polymer, metal and conditions of the above example. Hand drawing of these filaments to 100% elongation at room temperature gave strong filaments with a broken metal core completely surrounded by a polymeric sheath similar to FIGURE 11. Hand rolling of these hand-drawn filaments with a metal roller produces a strong, decorative filament with shiny platelets of the metal running the length of the filament in the core.

*Example II*

Molten poly(ethylene terephthalate) of relative viscosity 37 and molten tin maintained at 285 and 280° C. respectively were spun as a sheath and core of 84% and 16% by volume respectively of a composite filament, with a 1-hole spinneret similar to that shown in FIGURES 1–7. The monofilament was extruded down from the spinneret through a 2-inch air space at a cooling temperature, i.e., about 75° C. into a 1-foot long tube of water at constant head of pressure at 30° C. that flowed concurrently with the filament. Good spinning was enjoyed and the filament was continuously wound up at 121 yards per minute. The filament (0.0085 inch in diameter) had a shiny, continuous, tin core completely surrounded by polymer.

A sample of the filament was elongated 400% by drawing at room temperature (i.e., 5 times original length). This treatment fractured the core into small equal longitudinal segments (of about .0035″ in diameter and 0.017″ long and about 0.090″ apart) so that the filament resembled that shown in FIGURE 11 with a diameter of about 0.0045 inch. Hand rolling of the drawn filament with a metal roller flattened the filament and afforded decorative ribbons 0.017 inch wide and 0.002 inch thick, with a row of shiny, glittering, sequin-like segments of tin 0.012 inch wide, .0015 inch thick and 0.10 inch apart in the core oriented with the filament and completely surrounded by a polyester sheath with the appearance shown in FIGURE 12. Physical properties of these products of this Example II are given below:

| Treatment | Tenacity g.p.d. | Tensile Strength, p.s.i. | Ultimate Dry Elongation, Percent | Mi[1] | Denier/Filament |
|---|---|---|---|---|---|
| As spun | 0.32 | 8,300 | 648 | 9.6 | 800 |
| Drawing | 2.1 | 54,500 | 18 | 29 | 161 |
| Drawing plus rolling | 1.6 | 41,300 | 14 | 27 | 163 |

[1] Initial modulus of elasticity in grams per denier.

Reference to "ultimate elongation" herein, signifies the residual elongation in the filaments when stretched to the break under standard conditions used for testing elongation.

Figure 15:
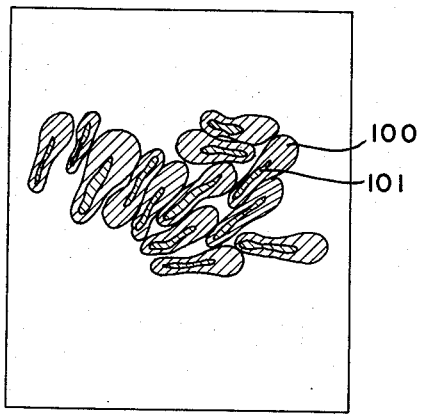

Another sample of the same as-spun filament as above was hand-rolled with a metal roller to give an increase in length equivalent to a 70% elongation of the original length (1.7×). The flattened filament with a continuous metal core had the cross-section of FIGURE 13. The rolled filament was then drawn over a pin at room temperature to give a total elongation of 250% of the filament's as-spun length (3.5×). The drawn filament had a continuous metal core and had the cross-section shown in FIGURE 14 where it can be noted that the filament cross-section partially reverted to round cross-section. Rolling of the drawn filament flattened the filament once more and gave a ribbon 0.010″ wide x 0.002″ thick with a continuous sheath (uniform along its length) of polyester completely surrounding a continuous core of tin about 0.006″ wide x 0.0008″ thick throughout as shown in FIGURE 15. All these filaments displayed a bright shiny core but the reflectivity was much greater with the rolled filaments in which the core was flattened during rolling. Physical properties of these products are given below:

| Filament Treatment | Tenacity, g.p.d. | Tensile Strength, p.s.i. | Ultimate Dry Elongation, Percent | Mi | Denier/Filament |
|---|---|---|---|---|---|
| As spun | 0.32 | 8,300 | 648 | 9.6 | 800 |
| Rolling | 0.50 | 13,000 | 260 | 13 | 519 |
| Rolling plus drawing | 1.20 | 31,100 | 65 | 26 | 245 |
| Rolling plus drawing plus rolling | 1.1 | 28,500 | 70 | 21 | 260 |

All the filaments of this example having continuous metal cores will conduct an electric current.

It was surprising that the above sequence of rolling and drawing allowed the tin core to be elongated to a total of 250% since the core of the as-spun filament fractured when elongated 23% by drawing without prior rolling. When it was attempted to roll and draw a length of cast tin similar to the core of the above filament, the tin drew to a total elongation of about 30% before breaking after being increased in length 10% by rolling. The maximum tensile strength that could be obtained by drawing at room temperature short of fracturing the core was 9200 p.s.i. The improvement by first rolling is apparent.

*Example III*

Figure 16:
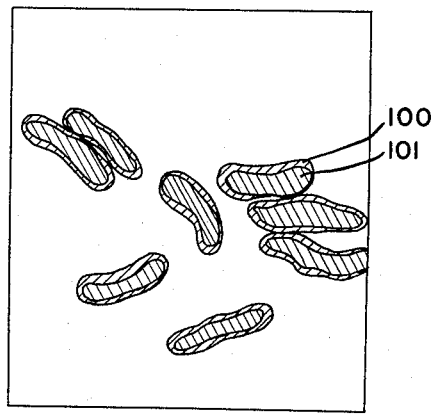

The polymer of Example II was replaced with poly-(hexamethylene adipamide) of relative viscosity 41, and a sheath-core filament was melt-spun as Example II. The as-spun filament, 0.0076 inch in diameter, containing 70% core by volume was elongated 20% by rolling and then drawn over a pin at room temperature to an overall elongation of 190% (2.9×) of the as-spun length without fracturing the core. The rolled and drawn filament had a flattened cross-section as shown in FIGURE 16, about 0.008 x 0.0017 inch in cross-section, and displayed a reflective, flattened continuous metal core completely surrounded by the polyamide sheath. The rolled and drawn filament had a tenacity of 0.76 g.p.d. (tensile strength of 42,800 p.s.i.), an ultimate elongation of 31%, a Mi of 12 g.p.d. and a denier per filament of 391.

*Example IV*

The polyamide in Example III was replaced with a linear polyethylene having a melt index (ASTM Std D1238–52T) of 4.7, a density of 0.96 and a melting point of 150° C. and a filament melt-spun (using the equipment of Example II) by extruding the polyethylene at 250° C. simultaneously with the molten tin at 60 yards per minute into a water quench as in Example II. Lengths of the filament containing a continuous tin core completely surrounded by a sheath of polyethylene could be elongated 60% by drawing after first elongating the filament 30% by rolling.

The metal core of the filaments of this invention can be any metal that is molten at the spinning temperature of the molten polymer (the polymer may be melt-spun at any temperature at which it is not substantially decomposed). Preferably the metal has a melting point below the melting point of the polymer, particularly in the case of polyamides and polyesters. Such metals include tin, lead, bismuth, selenium and their alloys with each other and with such metals as antimony and zinc, as, for example, bismuth solder, battery plate metal, white metal, aluminum solder, and the eutectic alloy of tin and lead. Higher melting alloys such as 70% aluminum 30% magnesium (melting point 435° C.), can also be used.

For the sheath of the filaments of this invention, any fiber-forming polymer that can be spun into filaments at a temperature at which the metal core is molten, can be used, such as polyesters, polyamides, polyethers, polyacetals, polyurethanes, polyureas, polyhydrocarbons as polyethylene and polytetrafluoroethylene and polyvinyl polymers as polyacrylonitrile, polyvinyl chloride, polyvinylidene chloride and their copolymers. Because of their commercial availability, ease of processing and excellent properties, polyesters, polyamides, or polyesteramides as described in U.S. Patents 2,071,250; 2,071,253; 2,130,523; 2,130,948; 2,190,770; 2,465,319 and in other places are preferred.

In the drawings, it is desired to point out that the small black specks occurring in the various views of filament cross-sections, e.g., FIGURES 10 and 13–16, represent the media used in mounting the filaments in the preparation of filament specimens to be photographed.

Although the process of this invention has been illustrated with melt-spinning, the desired two-component filaments can be plasticized melt-spun as described, for example, in U.S. Patent 2,706,674, issued to Rothrock on April 19, 1955, or spun wet or dry from a solution of a polymer component and the molten metal.

Although the ribbon-like filaments of this invention having a flat continuous metal core can be made by rolling or squeezing an as-spun filament made without any intentional drawing during and/or after spinning and so used, it is generally preferable to further increase the strength of the filament through orientation by drawing, followed by a second rolling step. A part of the orientation obtained by a separate drawing step can, of course, be obtained instead by drawing during spinning, in which case the filaments are wound up at a rate much greater than that at which they are extruded from the spinneret. The extent of such spin-draw possible will be limited by the ultimate elongation of the metal under the temperature of the process.

Although this invention has been illustrated only with rolling and drawing steps as separate operations, it is obvious that such operations can be performed continuously in sequence. In addition, a filament can be effectively rolled and drawn simultaneously by drawing it through a slit afforded by the smooth edges of two pins or rolls that exert a constant pressure on the filament. Also, by drawing the metal-core filaments over a series of pins arranged in a zigzag path so that the drawing tension applies a compressive force to the filament, a flattened filament with a continuous core can be obtained in a continuous process; it is advantageous to perform such a process at a temperature between 70 and 120° C.

In spinning the filaments of this invention, a relatively rapid rate of quenching is preferred in order to solidify the metal and so prevent possible formation of globules of metal in the core due to the surface tension of the molten metal. Such quenching can be accomplished by extruding into a concurrent, countercurrent or cross flow of gas or by spinning into a liquid.

The decorative filaments of this invention having intermittent platelets of metal in the core can be made by drawing a composite filament under such conditions that the metal core fractures, and thereafter rolling the filament. In general, this can be done at temperatures below the melting point or minimum value of the melting temperature range of a metal (where the metal does not have a definite melting point). The total elongation of the filament in the draw must exceed the ultimate elongation of the metal at the temperature of the draw. This will vary from metal to metal, but in general, the elongation necessary, which may range from 50 to 1500% (to produce the desired strength in the polymeric sheath) will be sufficient to fracture the metal in the as-spun filaments. In order to provide enough strength for the polymer to hold its form during the drawing step, the sheath of the as-spun filament should comprise about 5 to 95% of the filament's volume with the range 25 to 95% being preferred. The total force to break the core must be less than the force required to break the sheath. Knowing the tensile strengths of the metal and the polymer at the drawing temperature, the core-to-sheath ratio can be adjusted to afford a segmented core by drawing.

A given ratio of filament components is obtained with a given spinneret by adjusting the flow rates of the two liquids that are spun, as, for example, by changing the polymer feed pump rate or by altering the gas pressure that might be used, for example, to extrude the molten metal.

With some metals having a sufficiently high surface tension, it is possible to obtain an intermittent core by drawing the filaments at temperatures above the melting point of the metal so that the metal contracts into segments in the core.

The appearance of the decorative filaments of this invention having intermittent platelets in the core can be varied between wide limits within the scope of this invention.

The length of the metal segments before flattening is considered to be a function of the sheath-to-core volume ratio, the tensile strengths of the two components and the compressive force exerted by the sheath on the core. Thus, the length of the core segments in a given filament are increased by using a stronger metal and/or a larger metal core, and decreased by using a weaker metal and/or a smaller metal core.

The width of the platelets will be controlled by the above variables and the extent of rolling.

The final shape of the platelets will depend upon the length and diameter of the fractured core and the extent of rolling after fracturing the core. In general, the width of the platelets can be varied between about 20% and 95% of the average final filament width.

The distance between the platelets in the final yarn can be varied from the smallest distance required for segmentation to 800% and larger of the filament diameter by varying the total elongation after fracturing the core. In general, a minimum distance between platelets corresponding to about 200% of the drawn filament diameter will be preferred in order for the filament to have high enough strength, and a maximum distance of about 400% of the drawn filament diameter will be preferred in order to retain the decorative effects of the filament.

The filaments of this invention are of advantage in textile applications due to their strength and appearance. Those filaments with continuous or intermittent flattened reflective cores can be used to make all manner of novel fabrics. The appearance of the filaments can be altered by cospinning dyes or pigments in the polymer sheath or by dyeing the filaments or fabrics. In this way, filaments resembling gold lame can be formed at a fraction of the cost of the conventional gold-wound or gold-coated filaments. The opaqueness of the metal core to beta and gamma radiation can be utilized in the fabrication of clothing to provide protection against atom bomb debris, for example.

Those filaments with continuous metal cores can be used as insulated conductors, and those having very small diameter cores of low melting metals are useful as microampere fuses. Fabrics made of the filaments of this invention can be used to provide shielding around electronic equipment. The solubilities of the polymeric sheaths in various solvents can be used by applying a solvent for the polymer to a cut fabric so as to bind the contacting edges of the filaments in the fabric, for example, into a form-stable covering that will not be displaced by vibration of the equipment and yet reduce the usual electronic noise; the same effect may be obtained by fusing the edges of the fabric as by cutting with a knife heated to the melting point of the polymer.

Inasmuch as the filaments of this invention are especially useful in textiles, it is preferred that filaments intended for this use have drawn denier of 2 to 2000 per filament. However, for other uses the denier per filament may be much larger, and is selected according to the use to which the filaments are applied.

Orientation of the filaments before rolling should be incomplete, i.e., the filaments should not be completely drawn prior to rolling. Preferably, the filaments should be undrawn or drawn to a length not exceeding 90% of the length of the yarn (1.9×) if completely drawn at the rolling temperature. It is preferred that the rolling effect an elongation equal to at least 20% of the as-spun and undrawn length (whether or not drawing took place prior to rolling). Also, the total elongation of the yarn from all rolling and drawing steps (if drawing is used) should be at least 100%, i.e., the final filaments should have a length of at least two times the as-spun (undrawn) filaments; the term "substantially oriented" when used in the claims, shall, unless indicated otherwise, connote the said minimum elongation.

Any departure from the above description which conforms to the spirit of the invention is intended to be included within the scope of the claims.

I claim as my invention:

1. A substantially flat, composite filament comprising a substantially oriented sheath of synthetic linear polymer and a flat core of metal having a melting point below the decomposition point of the polymer.

2. A substantially flat, composite filament comprising a substantially oriented sheath of synthetic linear condensation polymer and a flat core of metal having a melting point below the decomposition point of the polymer.

3. A substantially flat, composite filament comprising a substantially oriented sheath of synthetic linear polyamide and a flat core of metal having a melting point below that of the polyamide.

4. A substantially flat, composite filament comprising a substantially oriented sheath of synthetic linear polyester and a flat core of a metal having a melting point below that of the polyester.

5. A substantially flat, composite textile filament comprising a substantially oriented sheath of synthetic linear polymer and a flat core of metal having a melting point below the decomposition point of the polymer.

6. A substantially flat, composite filament comprising a substantially oriented sheath of synthetic linear polymer and a discontinuous core composed of metal platelets, of a metal having a melting point below that of the synthetic linear polymer.

References Cited in the file of this patent

UNITED STATES PATENTS

| | | |
|---|---|---|
| 2,174,912 | Thielking | Oct. 3, 1939 |
| 2,266,363 | Graves | Dec. 16, 1941 |
| 2,308,638 | Balthis et al. | Jan. 19, 1943 |
| 2,389,379 | McCulloch | Nov. 20, 1945 |
| 2,393,595 | Dawson | Jan. 29, 1946 |
| 2,554,663 | Cowgill | May 29, 1951 |
| 2,636,833 | Borden | Apr. 28, 1953 |
| 2,674,025 | Ladisch | Apr. 6, 1954 |
| 3,830,156 | Burgess | Apr. 8, 1958 |

FOREIGN PATENTS

| | | |
|---|---|---|
| 278,387 | Switzerland | Jan. 16, 1952 |
| 907,876 | Germany | Mar. 29, 1954 |
| 710,084 | Great Britain | June 9, 1954 |